United States Patent [19]

Westall

[11] Patent Number: 4,701,814
[45] Date of Patent: Oct. 20, 1987

[54] MESSAGE LOCATION CALIBRATION METHOD AND SYSTEM

[75] Inventor: Michael J. Westall, Glendora, Calif.

[73] Assignee: Avicom International, Inc., Pasadena, Calif.

[21] Appl. No.: 820,542

[22] Filed: Jan. 17, 1986

[51] Int. Cl.$^4$ .............................................. G11B 15/18
[52] U.S. Cl. .................................... 360/72.3; 360/72.2
[58] Field of Search ................. 360/12, 13, 72.2, 72.3, 360/73, 74.3, 74.4

[56] References Cited

U.S. PATENT DOCUMENTS

| | | | |
|---|---|---|---|
| 4,062,048 | 12/1977 | Weber | 360/72.3 |
| 4,159,490 | 6/1979 | Wood | 360/12 |
| 4,471,391 | 9/1984 | Reagan | 360/72.3 |

*Primary Examiner*—Vincent P. Canney
*Attorney, Agent, or Firm*—David Weiss

[57] ABSTRACT

A method of calibrating the addresses of messages on a copy record duplicated from a master record of such messages having known addresses. Prior to duplication of the master record, first and second cues are recorded on the master record, which cues are separated by a known or determined distance along a track of the master record. After the copy record has been duplicated from the master record and installed in the message retrieval system, the system determines the distance between the duplicated cues on the copy record and derives a correction factor from the distance so determined and the known distance between the recorded cues on the master record. When a message is selected for being reproduced by the message retrieval system, the correction factor is applied to the address of the selected message on the master record to obtain a corrected address of the selected message on the copy record. The invention further includes the system utilizing the present method, as well as the copy record and the master record for use in connection with such system.

39 Claims, 8 Drawing Figures

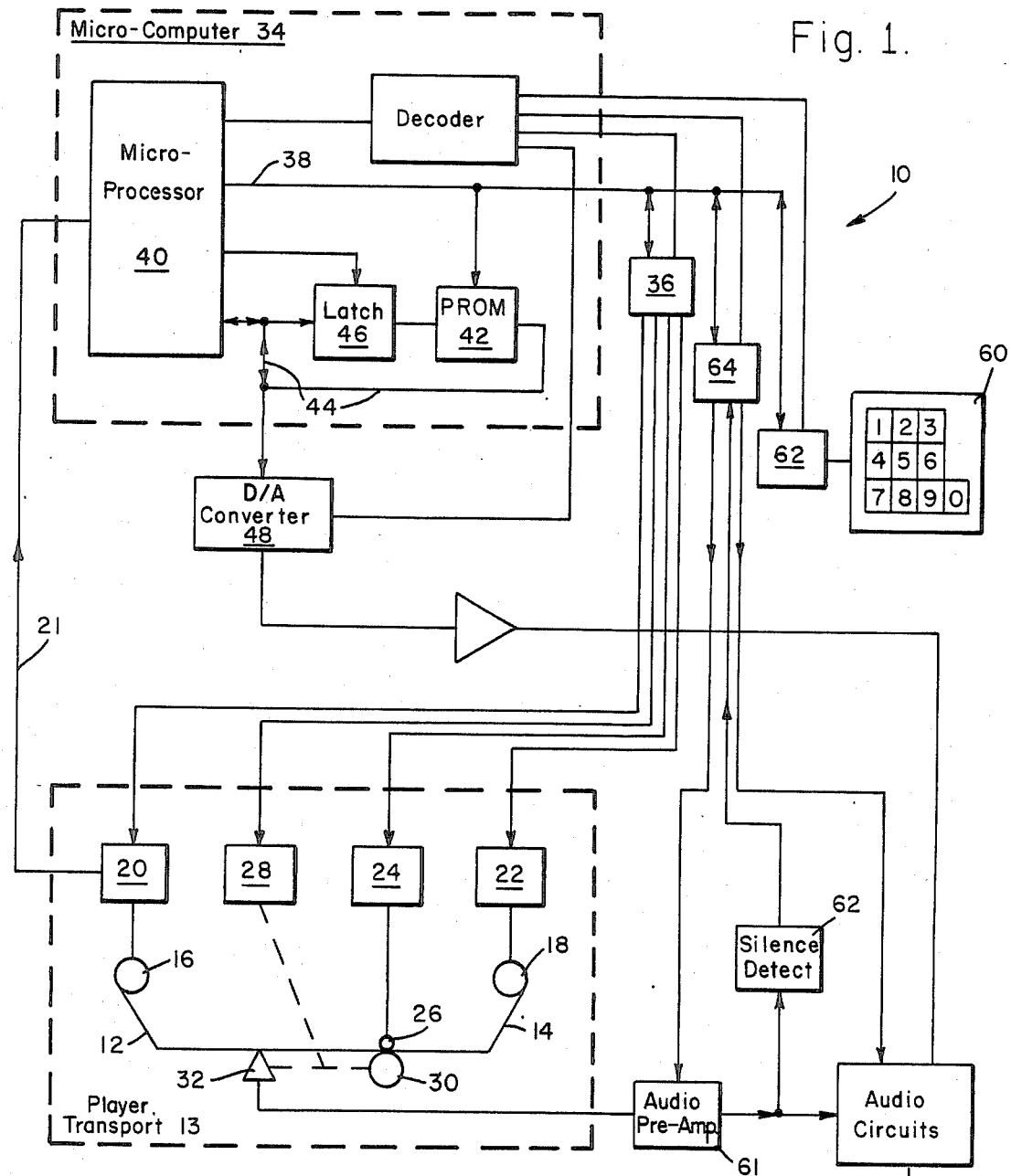
Fig. 1.
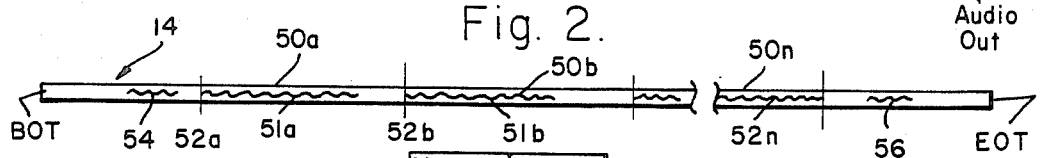
Fig. 2.
Fig. 4.

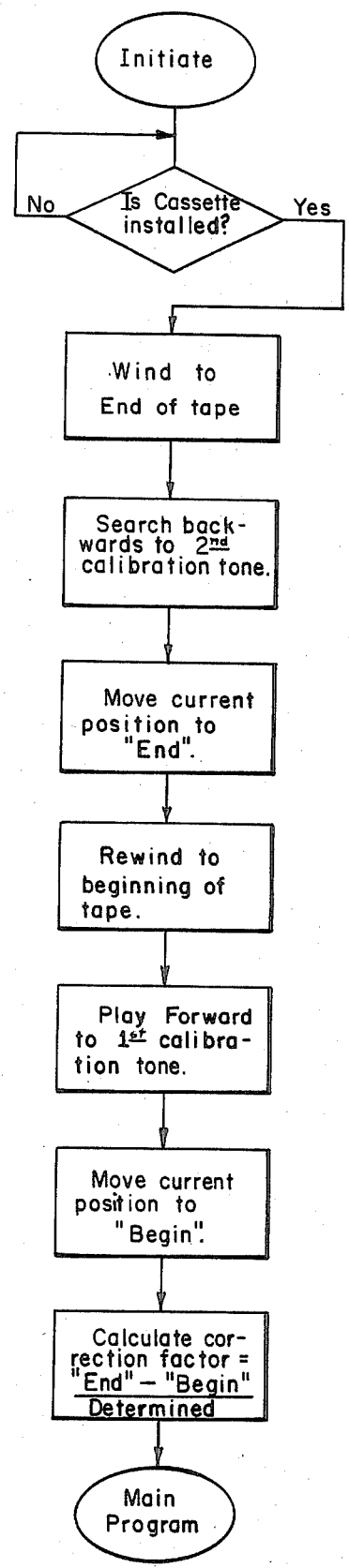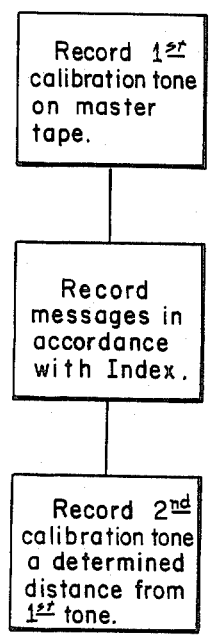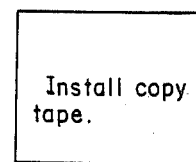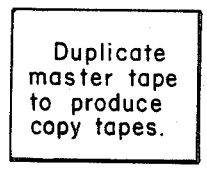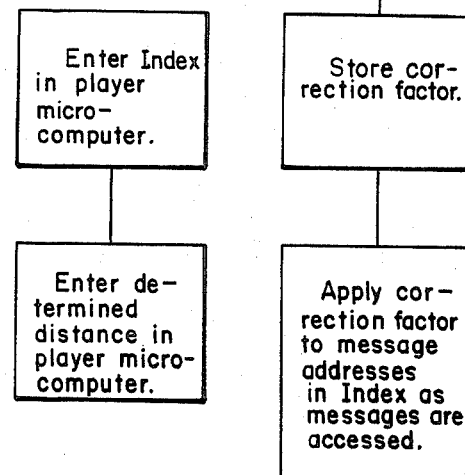

MESSAGE LOCATION CALIBRATION METHOD AND SYSTEM

BACKGROUND OF THE INVENTION

This invention relates to a method of and system for locating the beginnings of message segments on a copy recording duplicated from a master recording, and more particularly for correcting discrepancies in the message locations on the copy recording with respect to the message locations on the master recording introduced by the duplication process.

In one type of information retrieval system, prerecorded messages may be randomly accessed for being reproduced upon instruction. For example, an audio information retrieval system may include a magnetic tape cassette player for selectively reproducing audio messages which were prerecorded at specific physical locations along the cassette tape without an accompanying address cue or marker on the tape itself.

During recording of the audio messages on the cassette tape, the locations of the beginning of each message segment are either predetermined or contemporaneously determined through measurement of the tape lengths from the beginning of the tape ("BOT") to the start of each message segment. One measure of tape length is a count of the number of revolutions of one of the tape reels (either supply or take-up) between BOT and the beginning of a message segment. For example, the supply reel drive motor of the tape cassette transport may be monitored to generate a signal correlated to motor shaft rotation and the number of supply reel revolutions referenced to BOT. One type of useful signal includes a series of a predetermined number of electronic pulses for each revolution of the supply reel. During the recording process, therefore, the start of the first message segment will be located along the tape a first distance from BOT corresponding to a first pulse count from BOT, the start of the second message segment will be located along the tape a second distance from BOT corresponding to a second pulse count from BOT, the start of the third message segment along the tape will be located a third distance from BOT corresponding to a third pulse count from BOT, etc. In this manner, an index may be prepared correlating message segments (specified by respective message segment numbers) with respective pulse counts from BOT. This index or "look-up table" is available to a microcomputer controlling the player transport. In response to an operator's selecting a particular message for playback, the associated pulse count is "looked up" by the system's microprocessor and the pulses generated by the supply reel motor are monitored and tape movement is stopped (or slowed to normal playback speed) when this pulse count is reached.

If playback were performed using the original tape as recorded (i.e., the master recording), particularly played back on the same recorder/player transport, the above described method would locate selected messages for playback with accuracy. In many information retrieval applications, however, copy recordings are duplicated from the master recording, and the copies are distributed for being played back on player transports of variously located information retrieval systems. For example, an audio information retrieval system may be located in a passenger aircraft for providing keyboard access to prerecorded music and other passenger messages on a tape cassette. Duplicate cassettes are generally distributed to each aircraft, since it would be uneconomical and otherwise impractical to produce master recordings for distribution.

In duplicating copies from the master recording, the pulse counts from BOT to a particular message segment location associated with the copy may be different from the number of pulse counts associated with the location of the same message segment on the master. These discrepancies are caused during the duplication process primarily by the difference in tape speed produced by the transport reproducing the master tape and the transport recording the copy. Physical position errors in the locations of message segments are thereby introduced as the messages are recorded on the copy. The errors are cumulative from BOT as duplication proceeds and can be quite large toward the end of tape. For a 0.5% difference in the speeds of the two transports, the physical location of the last message segment on a sixty minute audio cassette may be erroneously displaced by more than fifteen inches. Accordingly, when retrieving messages from the copy tape recording, counting pulses from the look-up table associated with the master recording may position the copy tape at a place other than the actual beginning of the selected message segment.

SUMMARY OF THE INVENTION

The present invention corrects these position errors introduced by the duplication process while employing the index or look-up table associated with the master tape recording for message retrieval from the copy tape recording. In accordance with the invention, two calibration marks in the form of recorded cues or discrete tones are added to the master recording preferably during recording of the messages. The first calibration cue is preferably recorded in advance of the start of the first message and may also serve as a reference marker (or a new BOT) from which the distances to the message segment locations are measured. The second calibration cue is preferably recorded after the end of the last message segment on the master tape and may also serve as a marker indicating the end of tape ("EOT"). The distance between the two cues is determined, either by selecting the locations of the first and second cues and counting the tape reel revolutions between cues, or by recording the cues such that there has occurred a predetermined number of reel revolutions therebetween. As described earlier, the number of reel revolutions is related to the number of pulses in the signal derived from the tape reel drive motor. The master recording is then duplicated to produce at least one copy including the messages and the two calibration cues.

The distance between the two calibration cues on the master tape, represented by the pulse count between cues, is stored—along with the index or look-up table correlating message segment numbers with the representation of tape distance (i.e., pulse count) from the first calibration cue to the respective locations of the beginning of each message segment—in the memory of a microcomputer associated with the player transport.

When a copy tape cassette is installed in the player transport, the system proceeds through an initialization sequence for determining the distance along the length of the copy tape between the calibration cues which were duplicated on the copy tape. This distance is in terms of the number of reel motor drive pulses related to tape reel revolutions between the duplicated calibration cues. A correction factor is derived from this distance and the known distance between cues on the master tape.

The dominating position error inherent in the duplication process, being caused by a speed difference between the transports, is linear throughout the length of the tape. Other errors which are introduced may be non-linear, such as those resulting from variations in tape tension derived from such factors as varying reel diameter during duplication. For complete error correction, the derivation of the correction factor from the distance between cues on the copy tape and the distance between cues on the master tape may result in a correction factor which is different for each message location and is related to the causes of the error non-linearity. However, an acceptable constant error correction factor may be derived by assuming linearity of the errors throughout the length of the tape. Accordingly, in one implementation of the method of the present invention, the correction factor is derived by dividing the quantity representing the distance between cues on the copy tape by the quantity representing the distance between cues on the master tape. The derived correction factor is then stored in memory and is accessible to the player transport microcomputer.

When a message on the copy tape is selected for being reproduced or played back, the microcomputer looks up the message address (pulse count from the first calibration cue) in the look-up table and applies the correction factor thereto. If the correction factor were derived by division as described above, the correction factor is applied by multiplication; i.e., the microcomputer multiplies the distance from the first calibration tone to the beginning of the message segment by the correction factor. The microcomputer then monitors the reel drive motor pulse count until the corrected pulse count associated with the selected message segment has been reached, at which point the start of the selected message segment is in position for playback of the selected message.

Broadly described, the method of the present invention calibrates the addresses of messages on a copy record duplicated from a master record of such messages having known addresses. Prior to duplication of the master record, first and second cues are recorded on the master record, which cues are separated by a known or determined distance along a track of the master record. After the copy record has been duplicated from the master record and installed in the message retrieval system, the system determines the distance between the duplicated cues on the copy record and derives a correction factor from the distance so determined and the known distance between the recorded cues on the master record. When a message is selected for being reproduced by the message retrieval system, the correction factor is applied to the address of the selected message on the master record to obtain a corrected address of the selected message on the copy record. The invention further includes the system utilizing the present method, as well as the copy record and the master record for use in connection with such system.

BRIEF DESCRIPTION OF THE DRAWINGS

The novel features which are believed to be characteristic of the invention, together with further advantages thereof, will be better understood from the following description considered in connection with the accompanying drawings in which a preferred embodiment of the method of and system for practicing the invention are illustrated by way of example. It is to be expressly understood, however, that the drawings are for the purpose of illustration and description only and are not intended as a definition of the limits of the invention.

FIG. 1 is a block diagram of an audio information retrieval system which may be used in practicing the present invention;

FIG. 2 is a representation of a strip of magnetic tape indicating features of the present invention;

FIGS. 3($a$) through ($d$) are flow charts representing the preferred manner of practicing the present invention;

FIG. 4 is a representation of an index or look-up table correlating audio message segments with their locations on a master magnetic tape recording; and FIG. 5 is a flow chart illustrating the routine performed by the audio information retrieval system upon installation therein of an audio cassette according to the present invention.

DESCRIPTION OF THE PREFERRED EMBODIMENT

Turning first to FIG. 1, there is shown an audio information retrieval system 10 in block diagram form, for selectively reproducing music and other prerecorded audio messages duplicated onto a tape cassette 12 installed in an included tape cassette player or reproducer transport 13. The tape cassette 12 may be a standard Phillips audio cassette, such as those commonly identified by the designation C-60, C-90 or C-120, and includes a strip of magnetic tape 14 wound onto a supply reel 16 and extending onto a take-up reel 18 in conventional fashion.

The supply reel 16 is driven by a supply reel motor drive 20 which includes means for generating an electronic signal 21 having a predetermined number of pulses for each revolution of the supply reel 16. For example, the supply reel motor drive 20 may include a Hall element on the motor winding which generates such a pulse signal 21 having eight pulses per reel revolution. A similar take-up reel motor drive 22 drives the take-up reel 18, while a capstan motor drive 24 drives a tape capstan 26. The motor drives 20, 22 and 24, as well as a solenoid 28 for moving a capstan pinch roller 30 and a magnetic playback head 32 in or out of contact with the tape 14, are controlled by a microcomputer 34 through a transport input/output expander 36 communicating with an input/output bus 38.

The microcomputer 34 is controlled and driven by a microprocessor 40 which internally contains random access memory, timer/event counter and clock generator. Firmware for the audio information retrieval system 10 is contained in a programmable read only memory 42. A bi-directional multiplexed address/data bus 44 interfaces the microprocessor 40 to an address latch 46, the PROM 42 and a digital/analog converter 48.

The magnetic tape 14 is represented in FIG. 2 as containing a plurality of information message segments 50$a$, 50$b$, . . . 50$n$ along one track. Typically, the magnetic tape in an audio cassette includes more than one track; for illustrative purposes, however, only one track is shown in FIG. 2. Further, for illustrative purposes, the beginning of the tape 14 (BOT) is shown at the extreme left of the tape strip 14 and the end of the tape (EOT) is shown at the extreme right of the tape strip 14 in FIG. 2.

Each of the message segments 50 contains a recorded message 51a, 51b . . . , which when played back by the audio information retrieval system of FIG. 1 will produce a corresponding audio message, such as a musical selection, a verbal announcement or other audio program. Although the playing time associated with each message segment 50 may differ, it is preferred that each message segment 50 is of the same length so that the playing times are the same among segments, for example, corresponding to a playing time of one minute. In this case, if the time of a recorded message 51 were to be less than one minute the message's length (from start of message to end of message) would be less than the full length of a message segment 50. Similarly, if the length of a recorded message 51 corresponds to a time greater than the length of the one message segment 50, the recorded message 51 would extend into at least one other successive message segment 50. The message segments 50a, 50b . . . have respective beginnings 52a, 52b . . . , and each message segment 50 ends at the beginning 52 of the next message segment 50.

In accordance with the present invention, calibration marks in the form of recorded cue signals or tones 54, 56 of predetermined frequency and duration are contained on a track of the tape 14. In the preferred embodiment, a first recorded calibration tone 54 is positioned in advance of the beginning 52a of the first message segment 50a of a track, and the second recorded calibration tone 56 is positioned after the end of the last message segment 50n of that track. Alternatively, the tones 54, 56 may be located on a different track than the track on which the messages 51 are located.

The information appearing on the tape 14 has been duplicated from a master tape recording containing the same messages in the same order, as well as the first and second calibration tones 54, 56. However, discrepancies in the distance from BOT to the beginning 52 of each message segment 50 exist between the copy tape 14 and the master tape. The method of the present invention corrects these errors on the copy tape 14 with respect to the master tape, and is described by the flow diagrams of FIG. 3.

The preferred manner of preparing the master tape is indicated in FIG. 3(a). During the recording of the messages on the master tape, the first calibration tone is recorded near the beginning of the master tape. This calibration tone is of predetermined frequency, for example 400 Hertz; and of short duration, for example having an overall tape length of approximately nine inches or a recording time of five inches at $1\frac{7}{8}$ inches per second tape speed.

The messages are then recorded within their respective message segments and in accordance with an index or look-up table which correlates each message segment to its location or address on the tape, i.e. the distance along the tape from the beginning of the first calibration tone to the beginning of the message segment. The message segments may have different lengths to accommodate messages of different time durations such that the messages are respectively contained within one message segment only, or the message segments may have equal lengths corresponding to equal recording time durations. In the latter case, an index or look-up table will result with each message segment address being predetermined and corresponding to the distance along the master tape from the first calibration tone to the beginning of that message segment. Such an index or look-up table is represented in FIG. 4, and during recording of the master tape the messages are recorded such that the beginning of each message segment is located at its associated address as shown in the look-up table. The actual location on the tape of the beginning of each message segment is determined by the number of revolutions of the master transport supply reel referenced from the first calibration tone on the master tape, similar to the manner in which the player transport 13 of FIG. 1 monitors revolutions of the supply reel 16 to generate the pulse signal 21. For example, in the index or look-up table 58 of FIG. 4, message segment number 01 has an address A which is the pulse count corresponding to the distance along the tape from the first calibration tone to the beginning of the first message segment, message segment number 02 has an address B which is the pulse count corresponding to the distance along the tape from the first calibration tone to the beginning of the second message segment, etc. During recording of the master tape, the pulse count from the pulse signal is compared to the message segment address in the look-up table, and for this purpose a microprocessor is utilized having access to the look-up table of FIG. 4 stored in memory. Alternatively, the index of FIG. 4 may be established during the recording of the messages on the master tape, by noting the pulse count corresponding to the beginning of a message.

After the end of the last message segment recorded in the track containing the first calibration tone, a second calibration tone (preferably of the same frequency and duration as the first calibration tone) is recorded on the master tape a determined distance from the first calibration tone. The distance between the two calibration tones is known in terms of the pulse count of the electronic signal derived from the revolutions of the supply reel of the master tape record transport.

It is preferred but not necessary that the first calibration tone be located before the first message segment and that the second calibration tone be located after the last message segment. Nor is it necessary that the calibration tones be recorded at the same time the messages are recorded on the master, although if recorded at different times it may be necessary to use the same transport when the tones are recorded as was used when the messages were recorded.

As indicated in FIG. 3(b), the master tape recording is then duplicated to produce copy tape recordings. The copy tape includes the reproduced calibration tones and the messages which were on the master tape, and is represented in FIG. 2 previously discussed.

Continuing with FIG. 3(c), the index or look-up table of FIG. 4 is entered in PROM 42 of the microcomputer 34 associated with the player transport 13 (see FIG. 1), as well as the determined distance (i.e. the pulse counts) between the calibration tones recorded on the master tape. If the look-up table and the determined distance (pulse counts) between calibration tones on the master tape are standardized among master tapes of the same overall length, the look-up table and the pulse count of the determined distance may be pre-entered into PROM 42 for use with all copy tape cassettes of the same length. If the copy tape is a cassette as in the preferred embodiment, it is preferred (but not required) that the master tape is also a cassette, and of the same reel hub diameter as the copy tape cassette.

Turning to FIG. 3(d), the copy tape cassette 12 is installed in the player transport 13 of the audio information retrieval system 10 as shown in FIG. 1. The system 10 then proceeds to determine the distance between the calibration tones on the copy, and to calculate a correction factor from—and in this implementation of the invention is the quotient of—the distance (pulse count) between tones on the copy tape and the distance (pulse count) between tones on the master tape. This correction factor is then stored so that it is available for being applied to a message segment address in the index table as the corresponding message is accessed by an operator utilizing a selection means such as by keying in the appropriate message segment number of a keyboard 60 (FIG. 1) interfaced with the microcomputer 34 through a keyboard I/O expander 62. The correction factor is applied by the microprocessor 40 which, in this implementation of the invention, multiplies the correction factor by the address (pulse count from the first tone on the master) in the look-up table associated with the message segment accessed by the keyboard 60. The microprocessor 40 then monitors the pulse signal 21 and counts the number of pulses from the first reference tone 54 until the corrected pulse count corresponding to the accessed message segment has been reached, at which point the start of the selected message segment is in position for playback of the message recorded on that message segment.

The system 10 measures the distance between calibration tones 54, 56 on a copy tape 14 and calculates the correction factor whenever a tape cassette 12 is installed in the player transport 13. This initialization routine is represented in FIG. 5. When a cassette is installed, the tape is wound to its end (EOT) and the pulse counter of the microprocessor 40 is set to a large number. The player transport 13 then searches backward for the end of the second calibration tone 56 and its location is noted, and the tape is rewound to its beginning (BOT). The cassette is then played forward until the beginning of the first calibration tone 54 is found. The distance between the two calibration tones is calculated by the microprocessor 40, by subtracting the pulse counts noted at the two locations. The correction factor is calculated by the microprocessor 40 by dividing this difference by the determined distance (pulse count) between calibration tones on the master tape which was previously stored in the microcomputer 34.

The calibration tones are read from the copy tape 14 during transport by the magnetic playback head 32 and amplified by audio preamplifier 61, and the detection of the tones is implemented by conventional silence detect circuits 62 interfaced with the I/O bus 38 through an audio I/O expander 64. The tone detection procedure, and the procedure for locating the beginning of an accessed message segment, are performed in high speed search mode while the audio output is disabled by audio circuits 66. When the accessed message segment is in position for playback, the tape transport 13 slows to the appropriate playback speed and the audio output is enabled.

Thus there has been disclosed a method and system for correcting the stored addresses associated with message segments of a recording which has been duplicated from a master recording, as well as a copy recording and a master recording for utilization of the method in the system. Although the invention has been described with respect to magnetic tape and particularly with respect to an audio tape cassette, the invention need not be so limited. Accordingly, the invention should be limited only by the scope of the claims listed below.

I claim:

1. A method of calibrating addresses of messages on a copy record duplicated from a master record of said messages having known addresses, comprising the steps of:
   recording on said master record, prior to duplication thereof, a first cue and a second cue separated by a determined distance along a track of said master record,
   determining the distance between a first duplicated cue and a second duplicated cue along a track of said copy record, said first and second duplicated cues being duplicated on said copy record from said first and second cues recorded on said master record,
   deriving a correction factor from said determined distance between said cues on said copy record and said determined distance between said cues on said master record, and
   applying said correction factor to the address of a selected message on said master record to obtain a corrected address of said selected message on said copy record.

2. A method of calibrating addresses of messages on a copy record duplicated from a master record of said messages, comprising the steps of:
   recording on said master record, prior to duplication thereof, a first cue and a second cue separated by a determined distance along a track of said master record;
   upon installation in a reproducer transport of said copy record having along a track thereof a first cue and a second cue duplicated from said first and second cues recorded on said master record,
      determining the distance between said first and second cues along said track of said copy record, deriving a correction factor from the determined distance between said cues on said copy record and said determined distance between cues on said master record, and storing said correction factor; and
   upon selection of a message on the installed copy record for being reproduced,
      applying said correction factor to the address of the selected message on said master record to obtain a corrected address of said selected message on said copy record.

3. The method according to claim 1 or 2, above, wherein said correction factor is derived by dividing said determined distance between said cues on the copy record by said determined distance between said cues on said master record.

4. The method according to claims 1 or 2, above, wherein the location of said first cue on said master record is in advance of the first of said messages.

5. The method according to claims 1 or 2, above, wherein the location of said first cue on said master record is in advance of the first of said messages, and the addresses of said messages are referenced from said first cue.

6. The method according to claims 1 or 2, above, wherein the location of said first cue on said master record is in advance of the first of said messages, and the location of said second cue on said master record follows the last of said messages.

7. A method of calibrating addresses of messages on a copy record, comprising the steps of:
   on a first recording medium having at least one recording track, recording a first cue and a second cue separated by a determined distance along a recording track thereof, and recording messages on respective message segments along a recording track thereof, the beginnings of said message segments respectively located at determined addresses, duplicating said cues and said messages on a second recording medium to produce a copy record, installing said copy record in a reproducer transport, determining the distance along said copy record between said first and second cues, deriving a correction factor from the determined distance between said first and second cues of said copy record and said determined distance between said first and second cues on said first recording medium, and storing said correction factor; and applying said correction factor to the address of the beginning of a message segment on said first recording medium when the corresponding message segment on said installed copy record is selected for having the message duplicated thereon reproduced.

8. The method according to claim 7, above, wherein the location of said first cue on said first recording medium is in advance of the first of said message segments.

9. The method according to claim 7, above, wherein the location of said first cue on said first recording medium is in advance of the first of said message segments, and said addresses of said beginnings of said message segments are referenced from said first cue.

10. The method according to claim 7, above, wherein the location of said first cue on said first recording medium is in advance of the first of said message segments, and the location of said second cue on said first recording medium follows the last of said message segments.

11. A method of calibrating addresses of messages on a copy record, comprising the steps of:

on a recording track of a first recording medium,
recording a first cue near the beginning of said track,
recording messages on respective message segments along said track, the beginnings of said message segments respectively located at determined distances from said first cue,
recording a second cue along said track a determined distance from said first cue;

duplicating said track on a second recording medium to produce a copy record including a duplicated track with said message segments and said first and second cues;

installing said copy record in a reproducer transport, determining the distance along said duplicated track between said first and second cues, deriving a correction factor from the determined distance between said first and second cues of said copy record and said determined distance between said first and second cues on said first recording medium, and storing said correction factor; and applying said correction factor to the determined distance along said track of said first recording medium from said first cue to the beginning of a message segment when the corresponding message segment on said installed copy record is selected for having the message duplicated thereon reproduced.

12. The method according to claims 7 or 11, above, wherein said correction factor is derived by dividing said determined distance between said first and second cues on said copy record by said determined distance between said first and second cues on said first recording medium.

13. The method according to claim 11, above, wherein said correction factor is derived by dividing said determined distance between said first and second cues on said copy record by said determined distance between said first and second cues on said first recording medium, and said correction factor is applied by multiplying said correction factor by said distance along said track of said first recording medium from said first cue to the beginning of a message segment when the corresponding message segment on said installed copy recording is selected for having the message duplicated thereon reproduced.

14. The method according to claim 11, above, wherein said second cue is recorded along said track following the last of said message segments.

15. In a system for selectively reproducing messages on a message track of a copy record duplicated from a master record including a message track having messages recorded thereon, and including an index representative of distances to the beginnings of the respective messages along said message track of said master record:

said master record having recorded thereon a first cue and a second cue separated by a determined distance along a track of said master record;

said copy record having along a track thereof a first cue and a second cue duplicated from said first and second cues of said master record;

computer means, including memory means for storing said index and said determined distance;

a transport for transporting said copy record to permit reproduction of the messages from said copy record when said copy record is installed therein, and including signal generating means for generating a signal representing distance along a track of said copy record during transport thereof;

selection means for selecting messages on said copy record to be reproduced;

detection means coupled to said transport for detecting said cues on said copy record during transport thereof;

said computer means coupled to said player transport, to said selection means and to said detection means, for determining the distance between said cues along the track of said copy record containing said cues when said copy record is installed in said transport, for deriving a correction factor from the determined distance between said cues on said copy record and said determined distance between said cues on said master record, and for storing said correction factor, and for applying said correction factor to a representation of distance in said index corresponding to the selected message to produce a representation of corrected distance, and for causing said transport to transport said copy record said corrected distance along said message track.

16. The system according to claim 15, above, wherein said first and second cues are recorded along said message track of said master record, and said signal generated by said signal generating means represents distance along said message track of said copy record during transport thereof.

17. The system according to claim 15, above, wherein the location of said first cue on said master record is in advance of the first of said messages.

18. The system according to claim 15, above, wherein the location of said first cue on said master record is in advance of the first of said messages, and said distance to said beginnings of said respective messages along said message track are referenced from said first cue.

19. The system according to claim 15, above, wherein the location of said first cue on said master record is in advance of the first of said messages, and the location of said second cue on said master record follows the last of said messages.

20. In a system for selectively reproducing duplicated messages along an elongate copy record duplicated from an elongate master record having recorded messages thereon:
- said master record having recorded thereon a first cue and a second cue separated by a determined distance along the length of said master record, the location of said first cue along said master record being in advance of the first of said messages;
- said copy record having along the length thereof a first cue and a second cue duplicated from said first and second cues of said master record;
- an index representative of distances along the length of said master record from said first cue to the beginnings of the respective messages recorded thereon;
- computer means, including memory means for storing said index and said determined distance;
- a transport for transporting said copy record to permit reproduction of the messages from said copy record when said copy record is installed therein, and including signal generating means for generating a signal representing distance along said copy record from said first cue during transport of said copy record;
- selection means for selecting messages on said copy record to be reproduced;
- detection means coupled to said transport for detecting said cues on said copy record during transport thereof;
- said computer means coupled to said transport, to said selection mean and to said detection means,
  - for determining the distance between said cues along said copy record when said copy record is installed in said transport, for deriving a correction factor from the determined distance between said cues on said copy record and said determined distance between said cues on said master record, and for storing said correction factor, and
  - for applying said correction factor to a representation of distance in said index corresponding to the selected message to produce a representation of corrected distance, and for causing said transport to transport said copy record said corrected distance from said first cue such that said selected message on said copy tape is positioned for being reproduced.

21. The system according to claims 15 or 20, above, wherein said correction factor is derived by dividing said determined distance between said first and second cues of said copy record by said determined distance between said first and second cues on said master record.

22. The system according to claims 15 or 20, above, wherein said correction factor is derived by dividing said determined distance between said first and second cues on said copy record by said determined distance between said first and second cues on said master record, and said correction factor is applied by multiplying said correction factor by said representation of distance in said index corresponding to said selected message.

23. The system according to claim 20, above, said second cue having been recorded on said master record following the last of said messages.

24. In an audio message retrieval system, the combination comprising:
- an audio magnetic tape cassette including a magnetic tape record wound between a supply reel and a take-up reel, said magnetic tape record duplicated from a master tape record of a first cue recorded near the beginning of said master tape record, a plurality of audio messages recorded on respective message segments along said master tape record the beginnings of said message segments respectively located at determined distances from said first cue, and a second cue following said first cue by a determined distance along said master tape record;
- an index representative of distances along said master tape record from said first cue to the beginnings of said respective message segments;
- computer means, including memory means for storing said index and said determined distance;
- a transport for transporting said magnetic tape record of said cassette to permit audio reproduction of said messages duplicated thereon when said cassette is installed in said transport, and including signal generating means for generating a signal representing distance along said magnetic tape record from the first duplicated cue during transport of said magnetic tape record;
- selection means for selecting messages on said magnetic tape record to be reproduced;
- detection means coupled to said transport for detecting the first and second duplicated cues on said magnetic tape record during transport thereof;
- said computer means coupled to said transport, to said selection means and to said detection means,
  - for determining the distance between said cues along said magnetic tape record when said cassette is installed in said transport, for deriving a correction factor from the determined distance between said cues on said magnetic tape record and said determined distance between said cues on said master tape record, and for storing said correction factor, and
  - for applying said correction factor to a representation of distance in said index corresponding to the selected message to produce a representation of corrected distance, and for causing said transport to transport said magnetic tape record said corrected distance from said first cue such that said selected message on said magnetic tape record is positioned for being reproduced.

25. The system according to claim 24, above, said second cue having been recorded on said master tape record following the last of said audio messages recorded thereon.

26. The system according to claim 24, above, wherein said correction factor is derived by dividing said determined distance between said first and second cues on said magnetic tape record by said determined distance between said first and second cues on said master tape record.

27. The system according to claim 24, above, wherein said correction factor is derived by dividing said determined distance between said first and second cues on said magnetic tape record by said determined distance between said first and second cues on said master tape record, and said correction factor is applied by multiplying said correction factor by said representation of distance in said index corresponding to said selected message.

28. The method according to claims 1, 2, 7 or 11, above, wherein said cues are tones of short duration.

29. The system according to claims 15, 20 or 24, above, wherein said cues are tones of short duration.

30. An elongate copy record for use in a message retrieval system having a transport for transporting said copy record along its length, said copy record having been duplicated from an elongate master record of messages the beginnings of which are at known addresses along said master record, said copy record having thereon a first cue and a second cue duplicated from said master record having a first cue and a second cue recorded thereon separated by a known distance, the distance between said first and second cues on said copy record being determinable by the message retrieval system when said copy record is installed in the transport for deriving a correction factor from said known distance between said cues on said master record, said correction factor being storeable in the message retrieval system for being applied to an address of a selected message on said master record to obtain a corrected address of said selected message on said copy record.

31. The elongate copy record according to claim 30, above, wherein the location of said first cue on said master record is in advance of the first of said messages.

32. The elongate copy record according to claim 30, above, wherein the location of said first cue on said master record is in advance of the first of said messages, and said addresses of said beginnings of said respective messages are referenced from said first cue.

33. The elongate copy record according to claim 30, above, wherein the location of said first cue on said master record is in advance of the first of said messages, and the location of said second cue on said master record follows the last of said messages.

34. The elongate copy record according to claims 30, 31, 32 or 33, above, wherein said cues are tones of short duration.

35. A magnetic tape cassette including a magnetic tape, for use in a message retrieval system having a transport for transporting said tape along its length, said tape having recorded thereon a plurality of messages, a first cue and a second cue, said messages and said cues having been duplicated from a master tape recording of said messages and said cues, the beginnings of said messages being at known addresses along said master tape recording and said first and second cues being separated by a known distance along said master tape recording, the distance between said first and second cues on said magnetic tape being determinable by the message retrieval system when said cassette is installed in the transport for deriving a correction factor from said known distance between said cues on said master tape recording, said correction factor being storable in the message retrieval system for being applied to an address of a selected message on said master tape recording to obtain a corrected address of the selected message on said magnetic tape.

36. The magnetic tape cassette according to claim 35, above, wherein the location of said first cue on said master tape recording is in advance of the first of said messages.

37. The magnetic tape cassette record according to claim 35, above, wherein the location of said first cue on said master tape recording is in advance of the first of said messages, and the beginnings of said respective messages are referenced from said first cue.

38. The magnetic tape cassette according to claim 35, above, wherein the location of said first cue on said master tape recording is in advance of the first of said messages, and the location of said second cue on said master tape recording follows the last of said messages.

39. The cassette according to claims 35, 36, 37 or 38, above, wherein said cues are tones of short duration.

* * * * *